US010765960B2

(12) United States Patent
Bright

(10) Patent No.: US 10,765,960 B2
(45) Date of Patent: Sep. 8, 2020

(54) DOLL BODY MOTION ACCESSORY FOR RECREATIONAL VEHICLES

(71) Applicant: Jonathan Bright, Lawrenceville, GA (US)

(72) Inventor: Jonathan Bright, Lawrenceville, GA (US)

(*) Notice: Subject to any disclaimer, the term of this patent is extended or adjusted under 35 U.S.C. 154(b) by 0 days.

(21) Appl. No.: 16/589,909

(22) Filed: Oct. 1, 2019

(65) Prior Publication Data

US 2020/0101393 A1 Apr. 2, 2020

Related U.S. Application Data

(60) Provisional application No. 62/739,681, filed on Oct. 1, 2018.

(51) Int. Cl.
| | |
|---|---|
| *A63H 7/04* | (2006.01) |
| *A63H 11/18* | (2006.01) |
| *A63H 17/22* | (2006.01) |
| *A63H 3/50* | (2006.01) |
| *A63H 3/48* | (2006.01) |
| *B62J 11/00* | (2020.01) |
| *B62J 99/00* | (2020.01) |
| *B62J 50/40* | (2020.01) |

(52) U.S. Cl.
CPC .............. *A63H 11/18* (2013.01); *A63H 3/48* (2013.01); *A63H 3/50* (2013.01); *A63H 7/04* (2013.01); *A63H 17/22* (2013.01); *B62J 11/00* (2013.01); *B62J 50/40* (2020.02); *B62J 99/00* (2013.01)

(58) Field of Classification Search
CPC .......... A63H 7/04; A63H 11/10; A63H 11/14; A63H 11/18; A63H 17/22; A63H 17/25
See application file for complete search history.

(56) References Cited

U.S. PATENT DOCUMENTS

| | | | | |
|---|---|---|---|---|
| 2,251,006 A | * | 7/1941 | Savage | A63H 7/04 446/277 |
| 2,489,206 A | * | 11/1949 | Tomnie | A63H 7/04 446/274 |
| 2,567,453 A | * | 9/1951 | Swenson | A63H 17/36 446/286 |
| 2,783,586 A | * | 3/1957 | Plummer | A63H 7/04 446/294 |
| 2,827,733 A | * | 3/1958 | Noyes | A63H 7/04 446/277 |

(Continued)

*Primary Examiner* — John A Ricci
(74) *Attorney, Agent, or Firm* — Alston & Bird LLP

(57) ABSTRACT

A leg actuator mechanism, a method of manufacturing the leg actuator mechanism, and a doll implementing a leg actuator mechanism is provided. The leg actuator includes an upper leg mechanism comprising a hip end and an opposing knee end. The leg actuator also includes a lower leg mechanism comprising a first end and an opposing second end, wherein the first end of the lower leg portion is operably coupled to the knee end of the upper leg portion. The leg actuator further includes a follower mechanism. The follower mechanism includes a mounting defining a follower pathway configured to receive a follower joint. The follower mechanism also includes an upper follower connector and a lower follower connector. The follower mechanism moves at least one of the upper leg mechanism or the lower leg mechanism when activated.

20 Claims, 13 Drawing Sheets

(56) References Cited

U.S. PATENT DOCUMENTS

| | | | | |
|---|---|---|---|---|
| 4,386,479 A * | 6/1983 | Terzian | ................... | A63H 7/04 |
| | | | | 446/276 |
| 6,120,343 A * | 9/2000 | Migliorati | .............. | A63H 11/18 |
| | | | | 446/317 |
| 6,431,940 B1 * | 8/2002 | Buford | ................... | A63H 11/10 |
| | | | | 446/277 |
| 2003/0017779 A1 * | 1/2003 | Sakai | .................... | A63H 13/00 |
| | | | | 446/226 |

\* cited by examiner

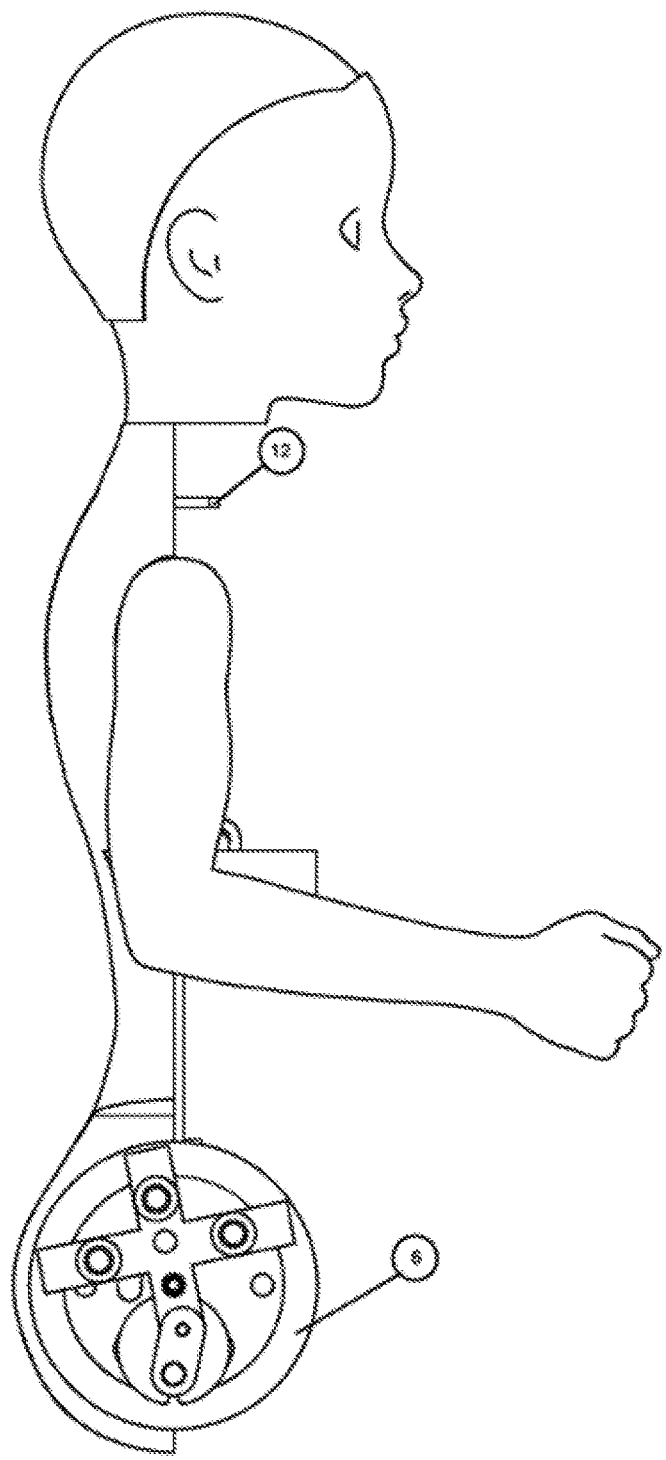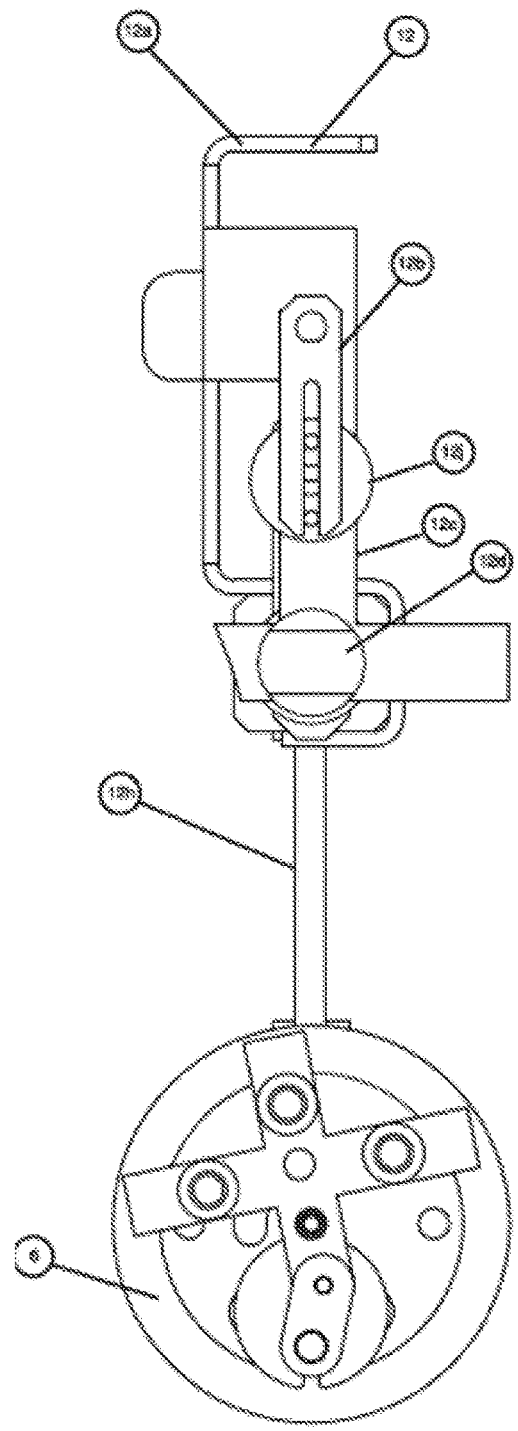
Figure 10A
Figure 10B

DOLL BODY MOTION ACCESSORY FOR RECREATIONAL VEHICLES

CROSS REFERENCE TO RELATED APPLICATION

This application claims the benefit of U.S. Provisional Application No. 62/739,681, filed Oct. 1, 2018, which application is hereby incorporated by reference in its entirety.

TECHNOLOGICAL FIELD

An example embodiment relates generally to toys for children. Specifically, dolls (humanoid or animal) and recreational vehicles. More particular, the invention relates to accessories that latch dolls to the above mention recreational vehicles for children.

BACKGROUND

Children play with dolls based upon their imagination. Doll accessories are created to enhance the interactive play between children and their dolls. Doll accessories created for recreational vehicles expand the interactive play between children and their dolls, allowing both the child and the doll to ride the recreational vehicle. Majority of doll accessories for recreational vehicles only allow the motionless body of the doll to be transported along with the child, by means of the recreational vehicle. Through applied effort, ingenuity, and innovation, many of these identified problems have been solved by developing solutions that are included in embodiments of the present disclosure, many examples of which are described in detail herein.

BRIEF SUMMARY

The following presents a simplified summary in order to provide a basic understanding of some aspects of the present disclosure. This summary is not an extensive overview and is intended to neither identify key or critical elements nor delineate the scope of such elements. Its purpose is to present some concepts of the described features in a simplified form as a prelude to the more detailed description that is presented later.

The present disclosure comprises of a novel leg actuator mechanism accessory for children recreational vehicles that would enable bodily motions of dolls while being transported by the above-mentioned recreational vehicles. In an example embodiment, a leg actuator mechanism is provided. The leg actuator mechanism includes an upper leg mechanism including a hip end and an opposing knee end. The leg actuator mechanism also includes a lower leg mechanism including a first end and an opposing second end. The first end of the lower leg portion is operably coupled to the knee end of the upper leg portion. The leg actuator mechanism also includes a follower mechanism. The follower mechanism of the leg actuator mechanism includes a mounting defining a follower pathway configured to receive a follower joint. The follower mechanism of the leg actuator mechanism also includes an upper follower connector. The upper follower connector is attached at a first upper follower end to the follower joint and to the upper leg portion at a second upper follower end and the upper follower connector is attached to the upper leg portion between the hip end and the knee end The follower mechanism of the leg actuator mechanism further includes a lower follower connector. The lower follower connector is attached at a first lower follower end to the follower joint and to the lower leg portion at a second lower follower end and the lower follower connector is attached to the lower leg portion between the first end of the lower leg portion and the second end of the lower leg portion. The follower mechanism is configured to move at least one of the upper leg mechanism or the lower leg mechanism when activated.

In some embodiments, the follower mechanism is configured to move the upper leg mechanism and the lower leg mechanism between a bent position and a straight position and an angle defined between the upper leg mechanism and the lower leg mechanism in the straight position is greater than the bent position. In some embodiments, a location of the second end of the lower leg mechanism is based on a location of the follower joint along a first direction within the follower pathway. In some embodiments, an angle defined between the upper leg mechanism and the lower leg mechanism is based on a location of the follower joint along a second direction within the follower pathway.

In some embodiments, the hip end of the upper leg mechanism is fixed relative to the leg actuator mechanism. In some embodiments, the follower pathway is an elliptical pathway. In some embodiments, the leg actuator mechanism also includes a driving mechanism configured to move the follower joint along the follower pathway.

In another example embodiment, a method of manufacturing a leg actuator mechanism is provided. The method includes providing an upper leg mechanism including a hip end and a knee end. The method also includes providing a lower leg mechanism including a first end and a second end. The first end of the lower leg portion is operably coupled to the knee end of the upper leg portion. The method further includes defining a follower pathway within a mounting configured to receive a follower joint. The method still further includes attaching an upper follower connector at a first upper follower end to the follower joint and to the upper leg portion at a second upper follower end. The upper follower connector is attached to the upper leg portion between the hip end and the knee end. The method also includes attaching a lower follower connector at a first lower follower end to the follower joint and to the lower leg portion at a second lower follower end. The lower follower connector is attached to the lower leg portion between the first end of the lower leg portion and the second end of the lower leg portion. The mounting, the upper follower connector, and the lower follower connector define a follower mechanism and the follower mechanism is configured to move at least one of the upper leg mechanism or the lower leg mechanism when activated.

In some embodiments, the follower mechanism is configured to move the upper leg mechanism and the lower leg mechanism between a bent position and a straight position and an angle defined between the upper leg mechanism and the lower leg mechanism in the straight position is greater than the bent position. In some embodiments, a location of the second end of the lower leg mechanism is based on a location of the follower joint along a first direction within the follower pathway. In some embodiments, an angle defined between the upper leg mechanism and the lower leg mechanism is based on a location of the follower joint along a second direction within the follower pathway.

In some embodiments, the method also includes affixing the hip end of the upper leg mechanism relative to the leg actuator mechanism. In some embodiments, the follower pathway includes an elliptical pathway. In some embodiments, the method also includes providing a driving mechanism configured to move the follower joint along the follower pathway.

In still another example embodiment, a doll is provided for dynamic movement. The doll includes a doll body configured with at least one moveable leg. The doll also includes a leg actuator as discussed herein. The doll further includes a drive mechanism including a driving insert. The rotational movement of the driving insert is transferred to the at least one leg actuator mechanism via one or more links.

In some embodiments, the driving insert is configured to receive a driver insert, wherein the driver insert is configured to activate the drive mechanism. In some embodiments, the doll also includes one or more arm mechanisms operably coupled with the drive mechanism configured to move based on the rotational movement of the driving insert. In some embodiments, the doll also includes a carrier mechanism removably attached to the drive mechanism, where the carrier mechanism is configured with the driver insert to activate the drive mechanism via rotational movement. In some embodiments, the carrier mechanism is attached to a vehicle and the activation of the driver insert is based on movement of the vehicle. In some embodiments, the driving insert is internal of the doll body.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1A:
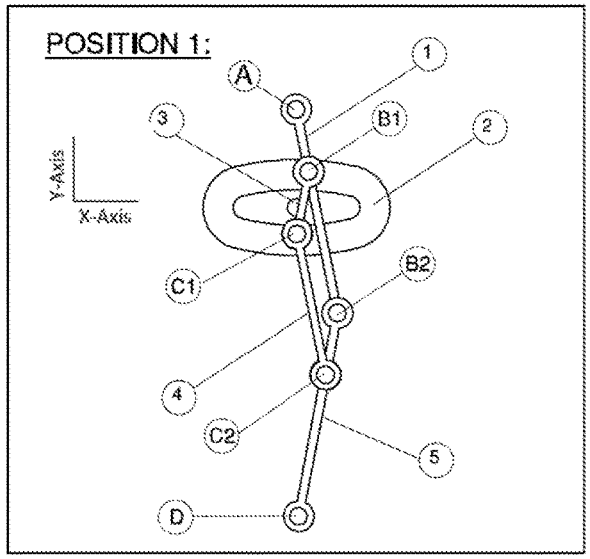
Figure 1B:
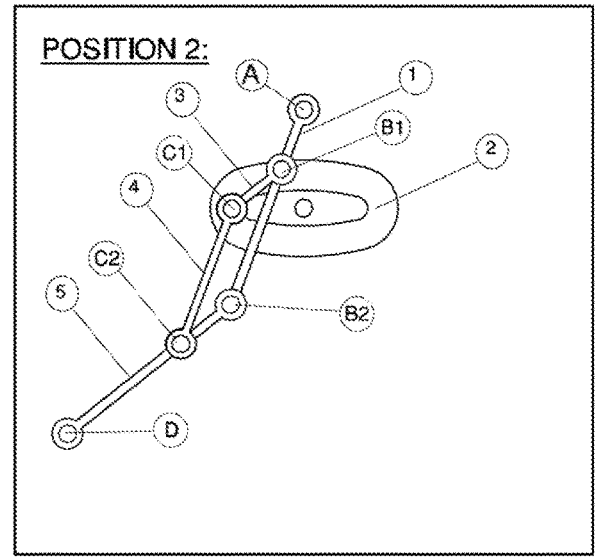
Figure 1C:
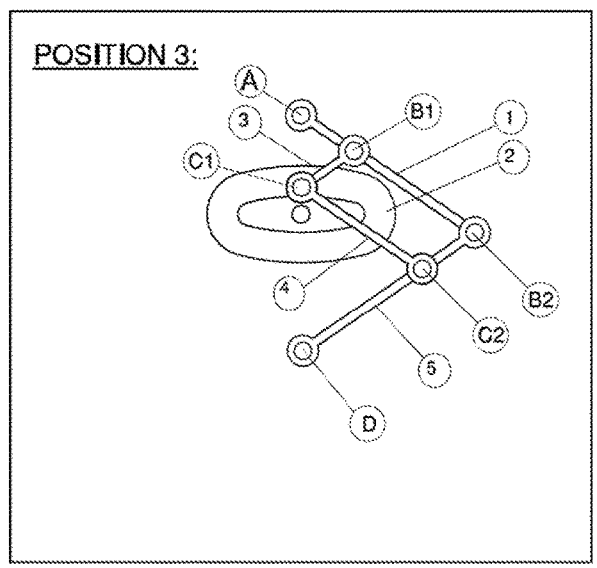
Figure 1D:
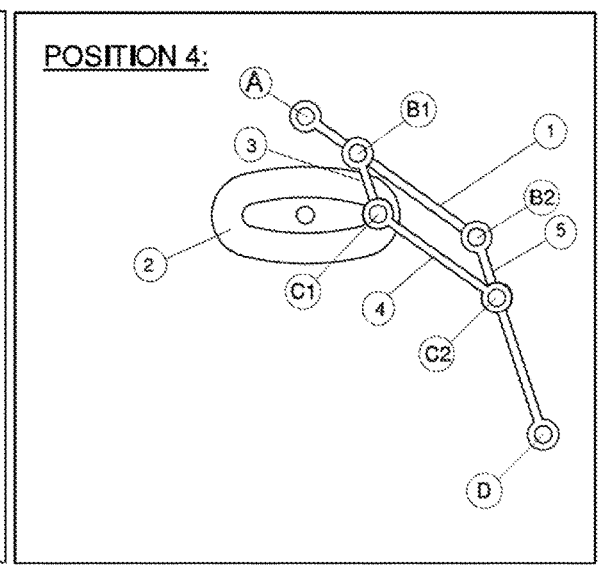
Figure 2B:
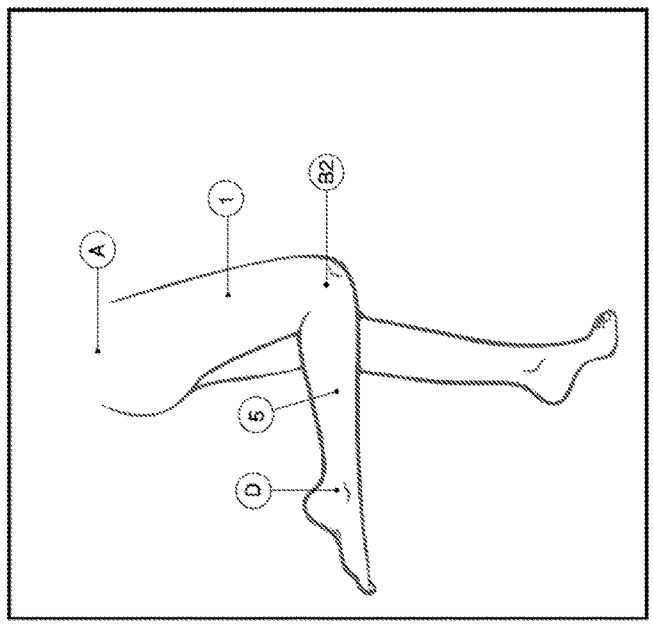
Figure 2A:
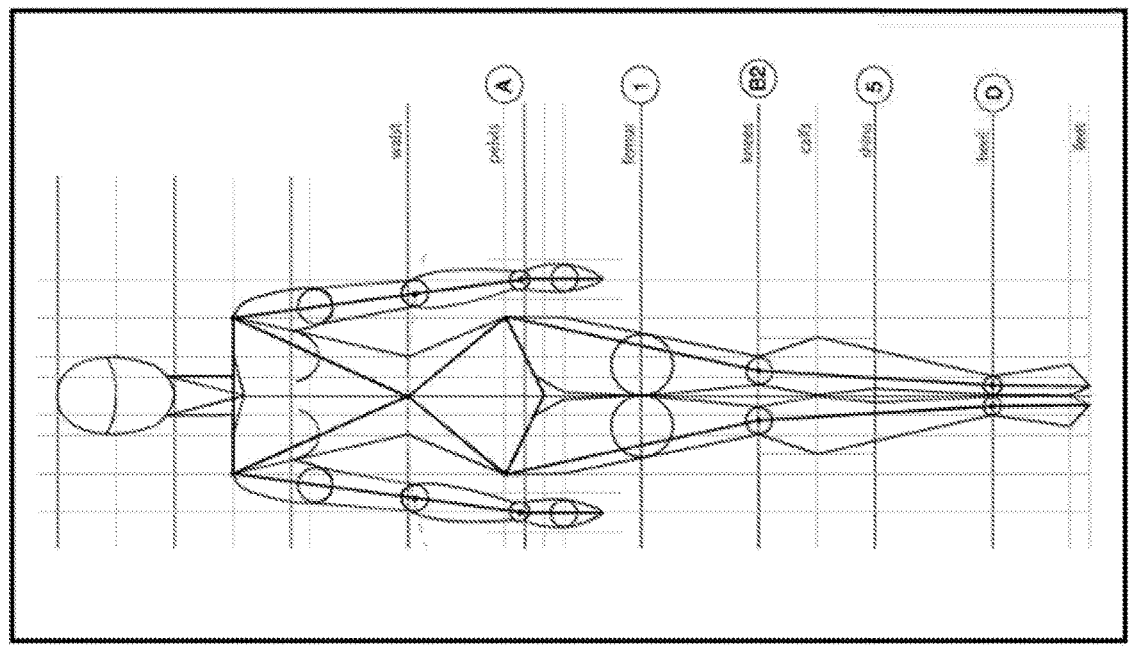
Figure 3A:
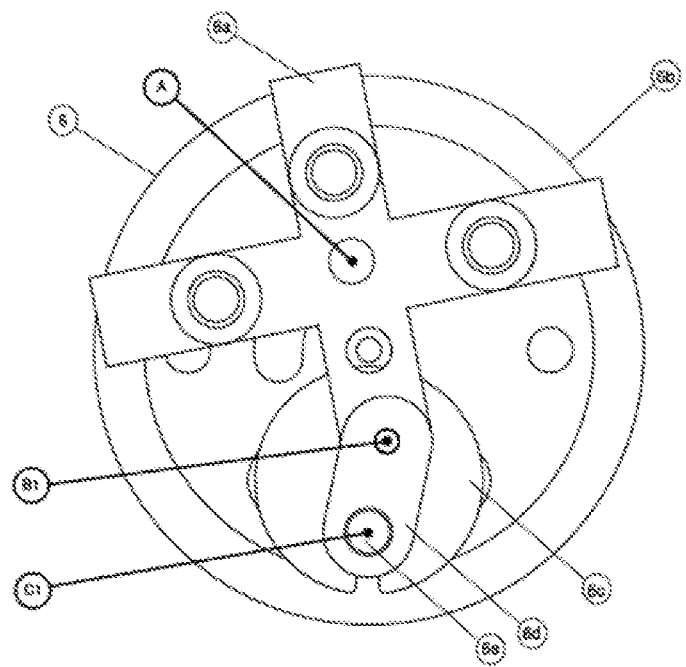
Figure 3B:
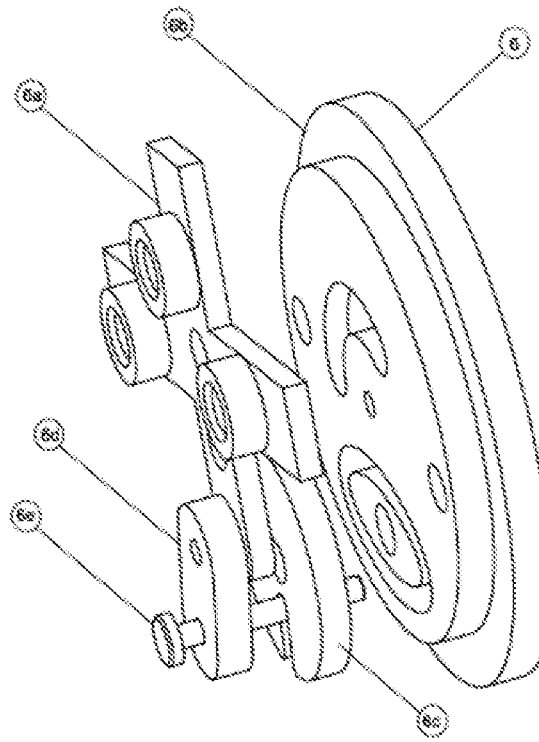
Figure 5:
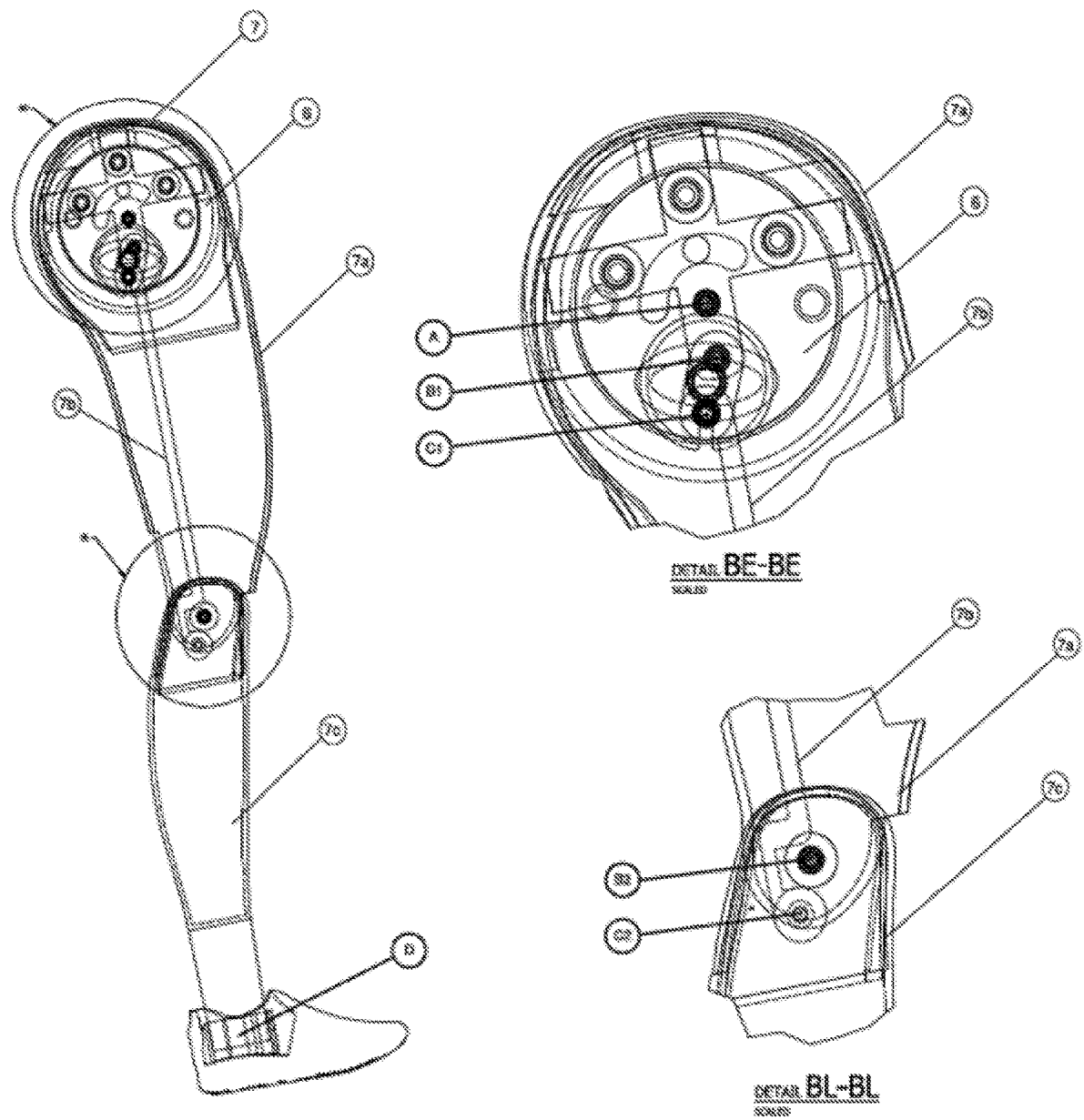
Figure 6:
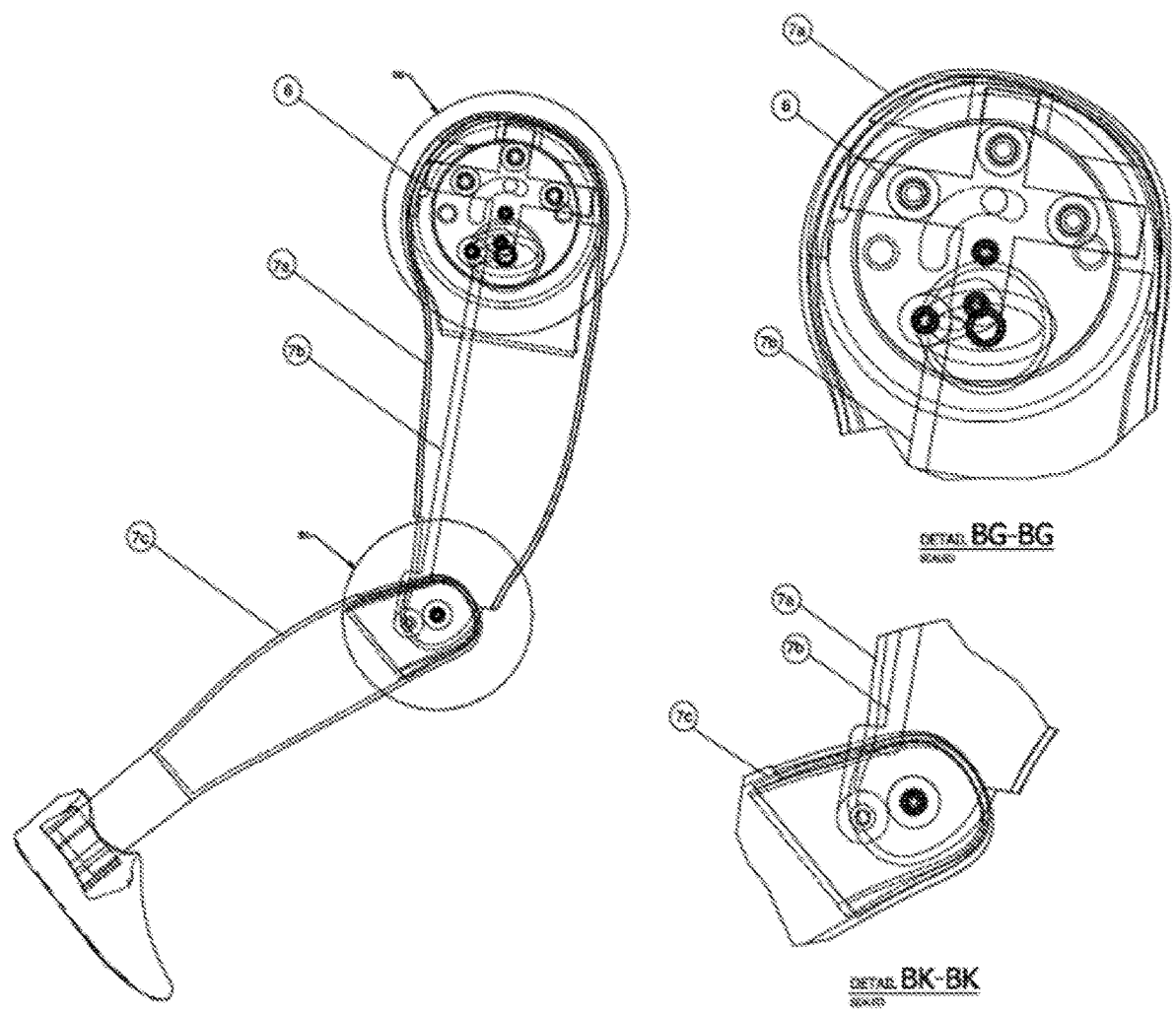
Figure 7:
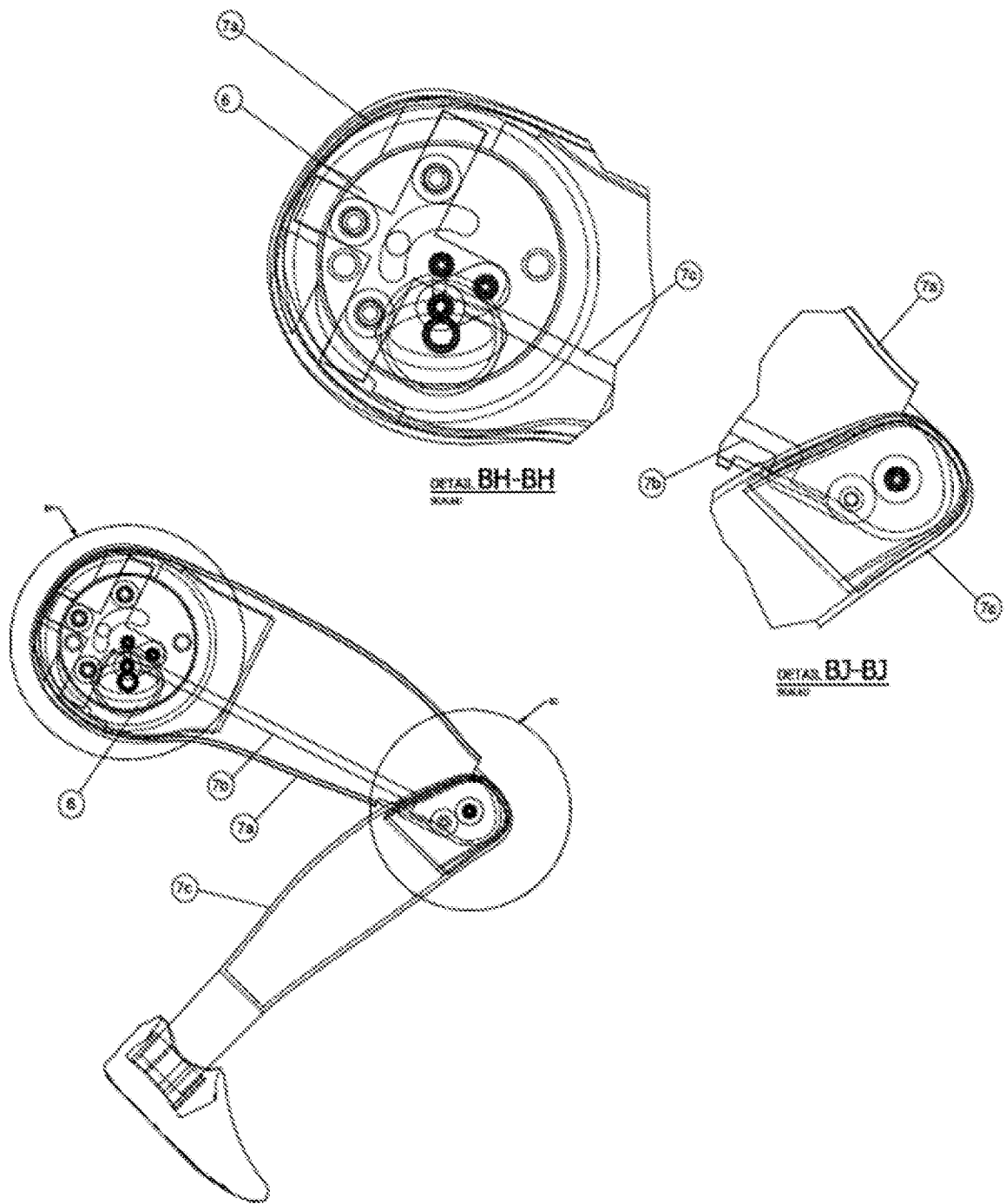
Figure 8:
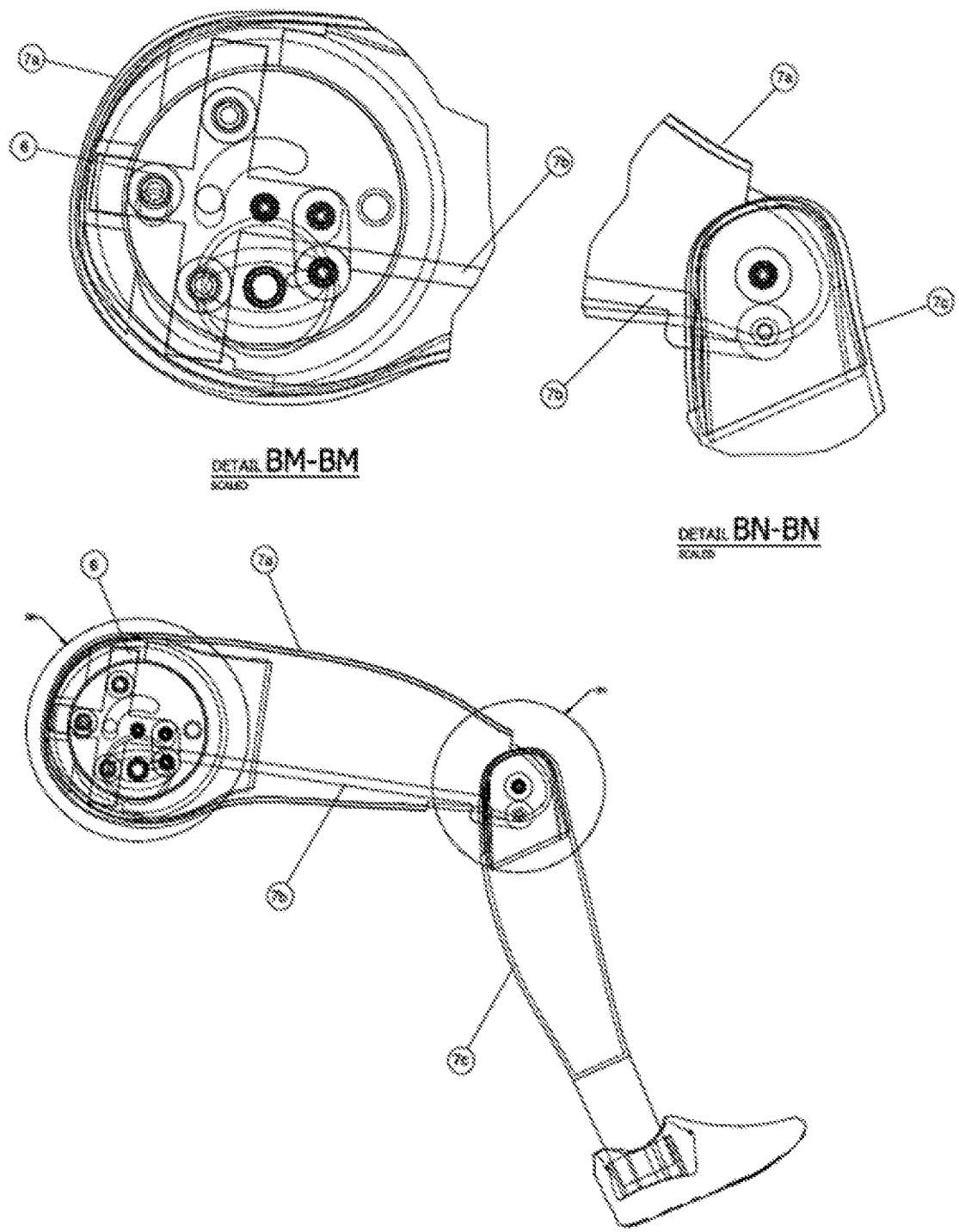
Figure 9A:
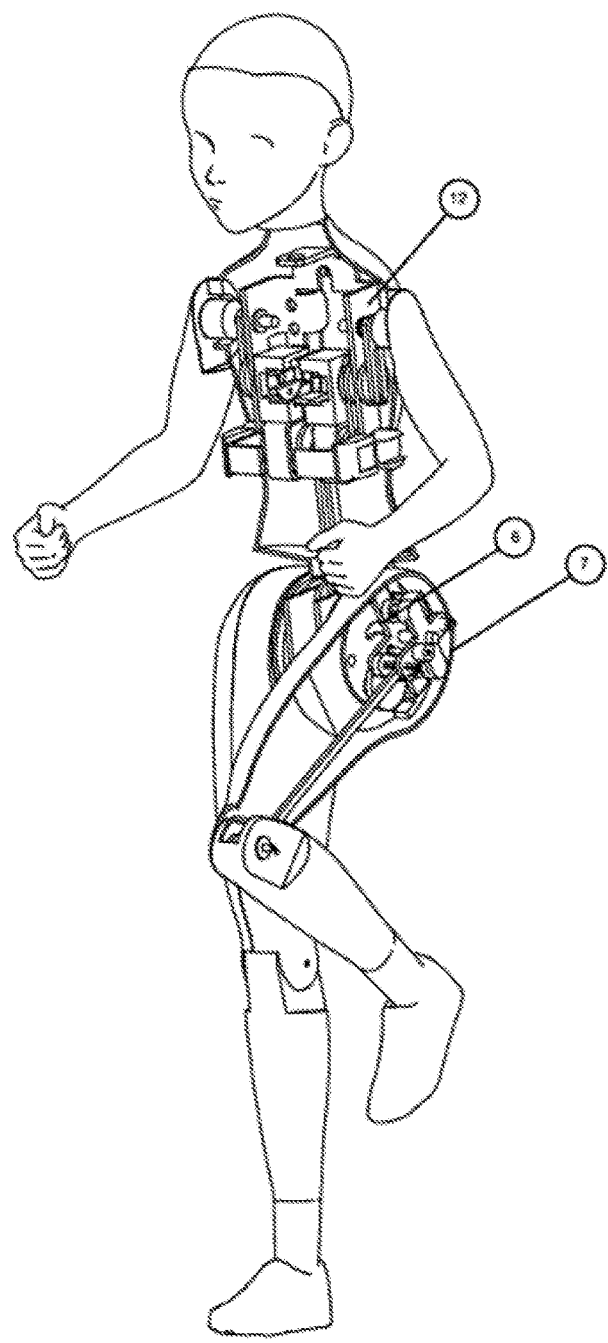
Figure 9B:
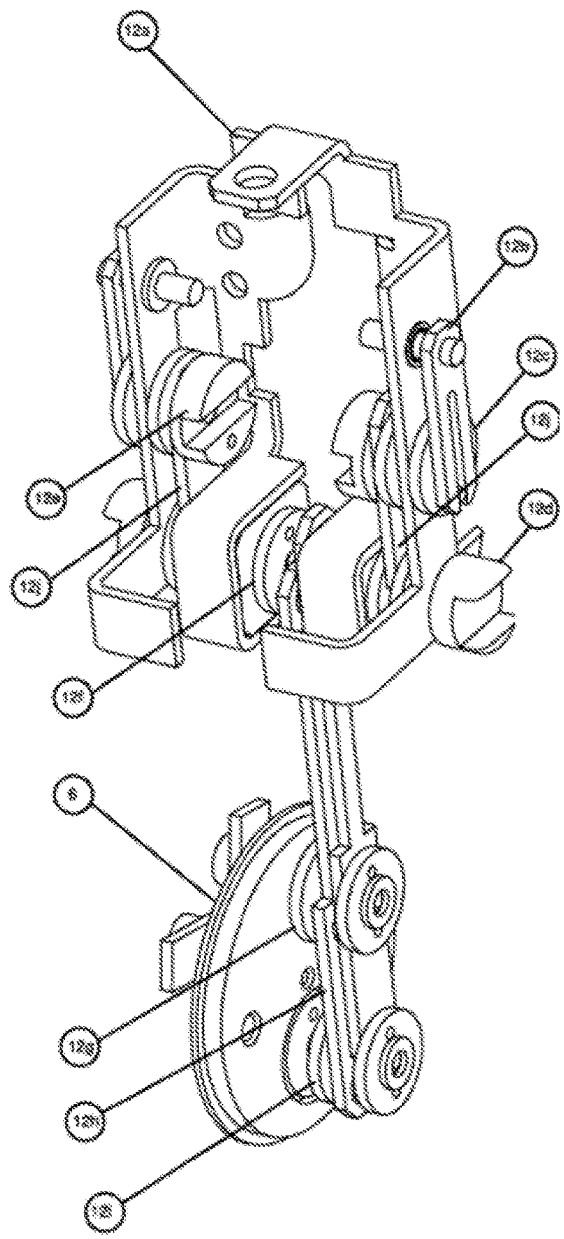
Figure 11A:
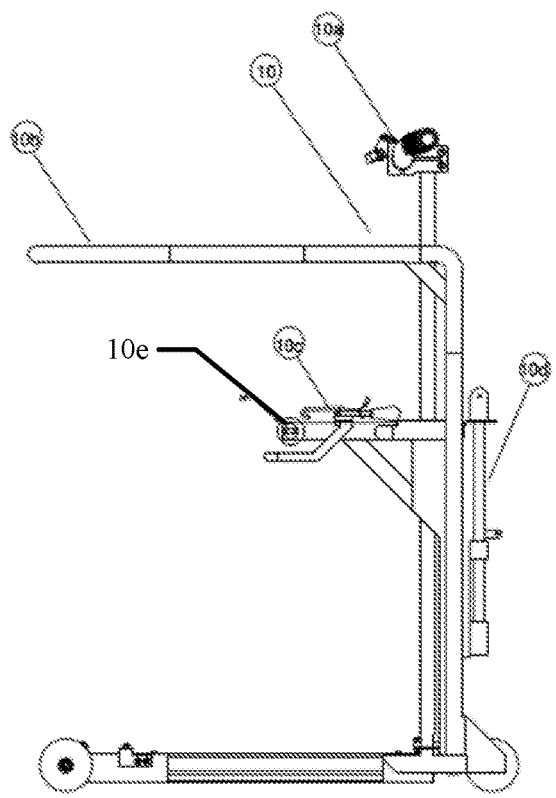
Figure 11B:
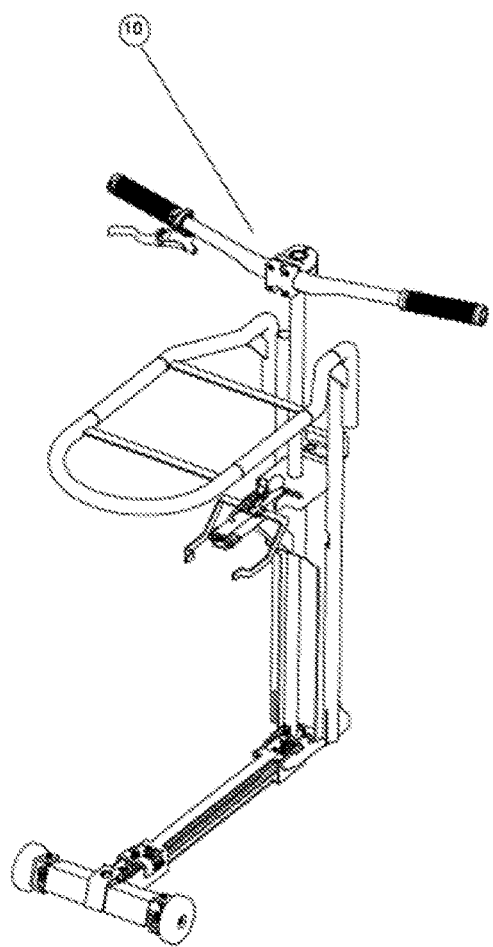
Figure 11C:
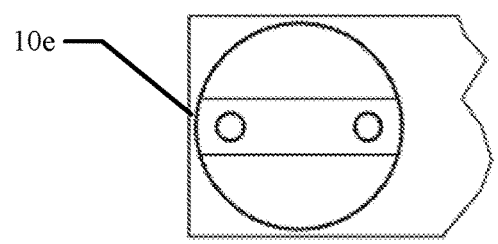
Figure 12:
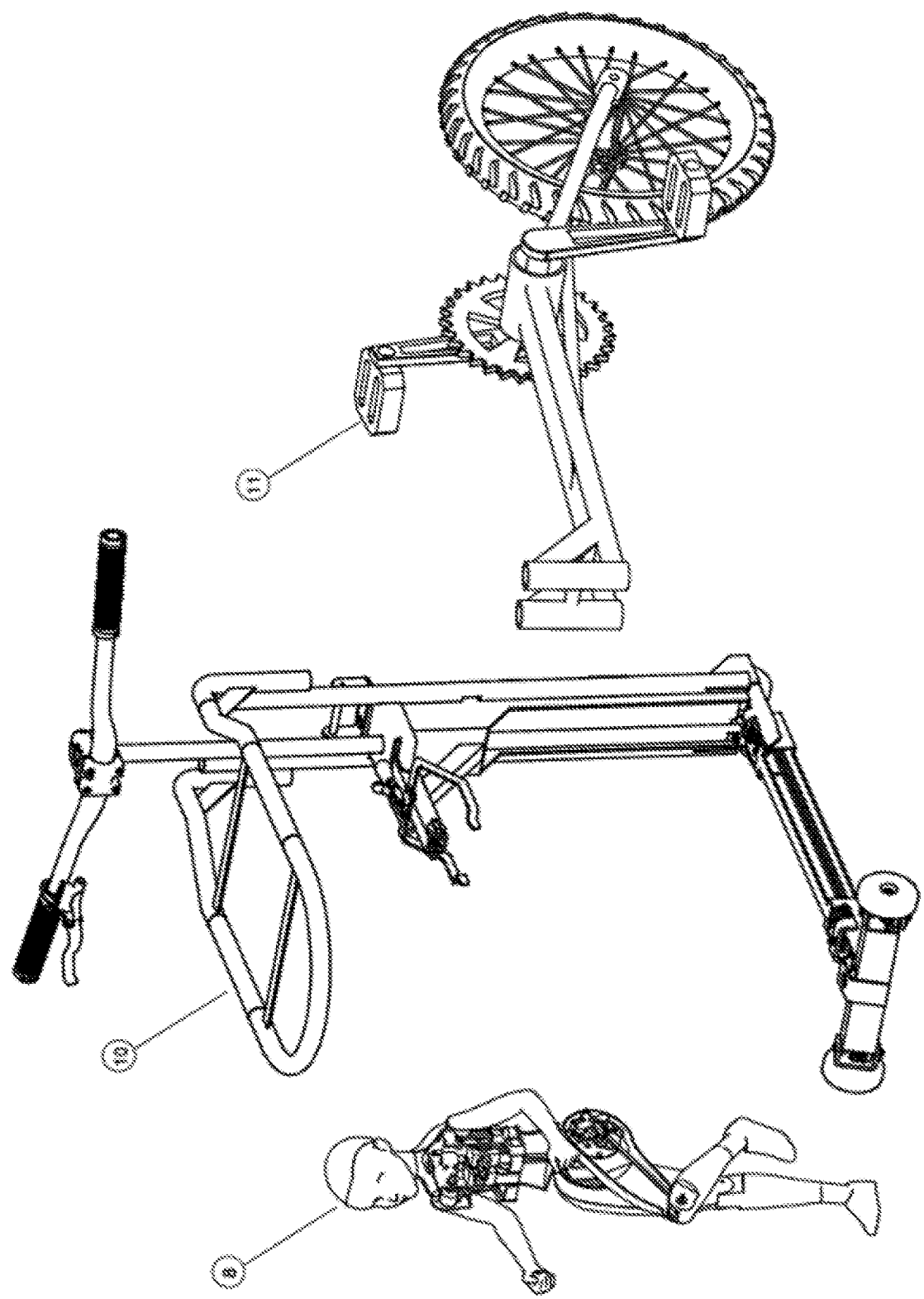
Figure 13:
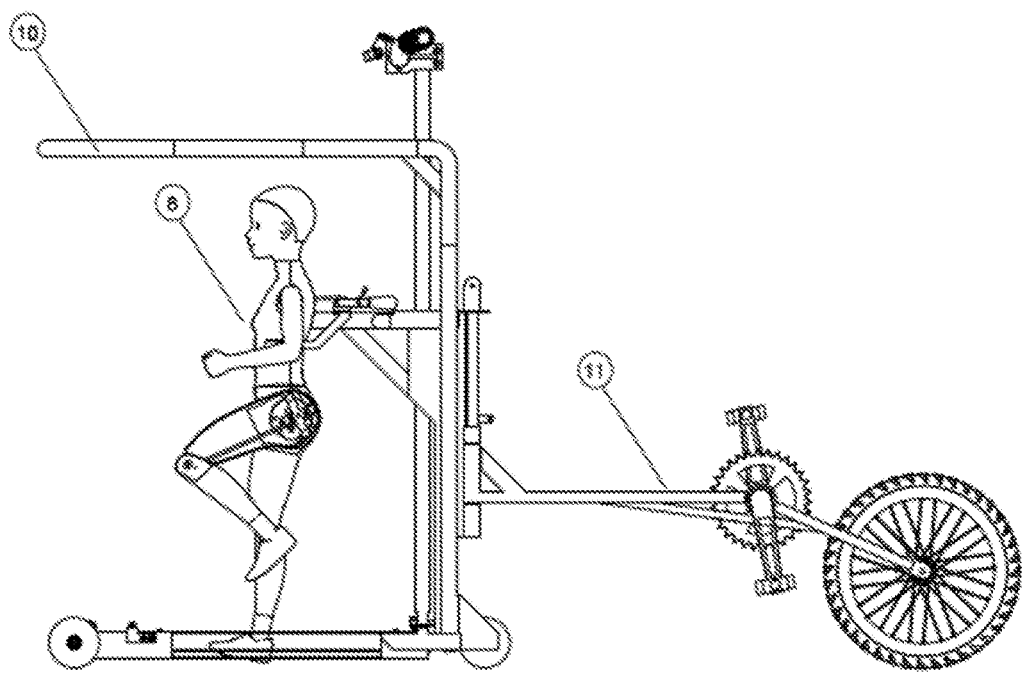
Figure 13:
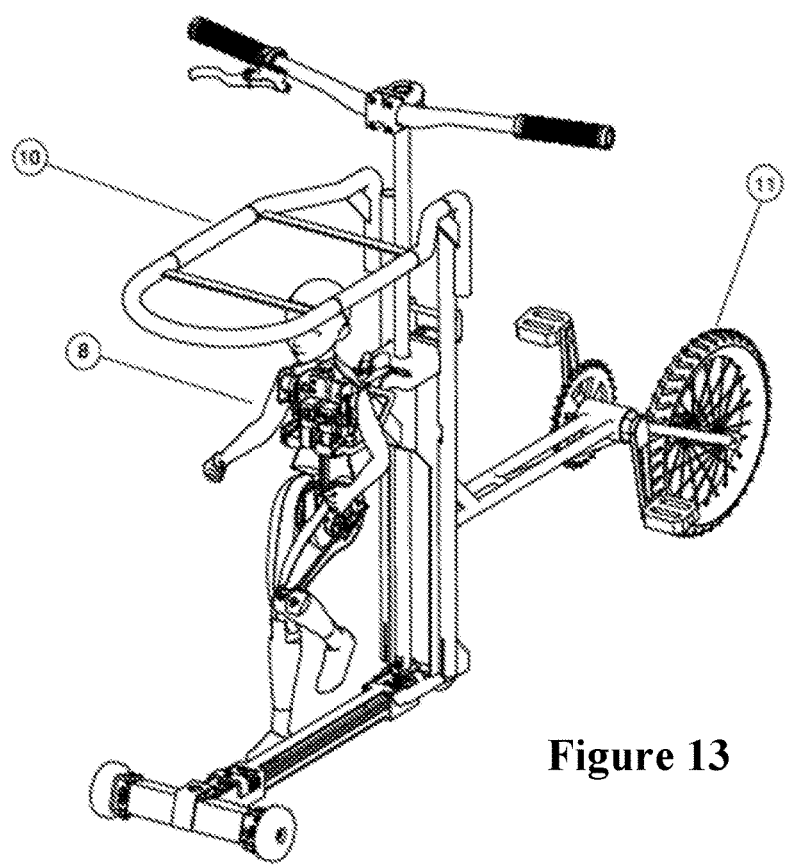

Having thus described certain example embodiments of the present disclosure in general terms, reference will hereinafter be made to the accompanying drawings, which are not necessarily drawn to scale, and wherein:

FIGS. 1A-1D illustrate a simplified leg actuator mechanism travelling along a follower pathway in accordance with example embodiments of the present disclosure;

FIGS. 2A-2B illustrate the components shown in FIGS. 1A-1D as an approximation of a human body in accordance with example embodiments of the present disclosure;

FIGS. 3A-3B illustrate both a partially assembled (FIG. 3A) and an exploded-view (FIG. 3B) of a mounting assembly configured to operation in accordance with an example embodiment of the present disclosure;

FIGS. 4A-4D illustrate an example embodiment of the leg actuator mechanism, such as the one shown in FIGS. 1A-1D, travelling along the follower pathway in accordance with example embodiments of the present disclosure;

FIG. 5 illustrates the internal components of a leg actuator mechanism in an instance the follower joint is in the first position in accordance with example embodiments of the present disclosure;

FIG. 6 illustrates the internal components of a leg actuator mechanism in an instance the follower joint is in the second position in accordance with example embodiments of the present disclosure;

FIG. 7 illustrates the internal components of a leg actuator mechanism in an instance the follower joint is in the third position in accordance with example embodiments of the present disclosure;

FIG. 8 illustrates the internal components of a leg actuator mechanism in an instance the follower joint is in the fourth position in accordance with example embodiments of the present disclosure;

FIGS. 9A-9B illustrate a cut-away view of a doll with a driving mechanism and a leg actuator mechanism in accordance with an example embodiment of the present disclosure;

FIGS. 10A-10B illustrate additional side, cut-away view of a doll with a driving mechanism and a leg actuator mechanism in accordance with an example embodiment of the present disclosure;

FIGS. 11A-11C illustrate an example carrier mechanism (FIGS. 11A-11B) for a doll and driver insert (FIG. 11C) for attached the doll to the carrier mechanism in accordance with an example embodiment of the present disclosure;

FIG. 12 illustrates the doll, the carrier mechanism, and an exemplary vehicle detached from one another in accordance with an example embodiment of the present disclosure; and FIG. 13 illustrates the doll, the carrier mechanism, and the exemplary vehicle removably attached together in accordance with an example embodiment of the present disclosure.

DETAILED DESCRIPTION

The present disclosure now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

The components illustrated in the figures represent components that may or may not be present in various embodiments of the invention described herein such that embodiments may include fewer or more components than those shown in the figures while not departing from the scope of the invention. Some components may be omitted from one or more figures or shown in dashed line for visibility of the underlying components.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of the stated features, steps, operations, elements, and/or components, but do not prelude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so denied herein.

The present disclosure is to be considered as an exemplification of the various inventions, and is not intended to limit the disclosure to the specific embodiments illustrated by the figures or description below.

Referring now to FIGS. 1A-1D, a simplified version of the leg actuator mechanism is provided in accordance with an example embodiment of the present disclosure. As shown, various embodiments of the leg actuator mechanism include an upper leg mechanism 1, a lower leg mechanism 5, a mounting 2, an upper follower connector 3, and a lower follower connector 4.

In various embodiments, the mounting 2 defines a follower pathway configured to receive a follower joint C1. As shown, the upper follower connector 3 and the lower follower connector 4 are operably coupled at the follower joint C1. For example, the first upper follower end of the upper follower connector 3 may be operably coupled to the first lower follower end of the lower follower connector 4 at the follower joint C1. In various embodiments, the upper follower connector 3 may be affixed to the upper leg mechanism 1 at the second upper follower end (e.g., the end at joint B1) between the hip end (e.g., the end at hip joint A) of the upper leg mechanism 1 and the knee end (e.g., the end at lower knee joint B2) of the upper leg mechanism 1. In various embodiments, the lower follower connector 4 may be affixed to the lower leg mechanism 5 between the first end (e.g., lower knee joint B2) and the second end (e.g., heel joint D) of the lower leg mechanism 5 at the second lower follower end (e.g., the end at joint C2). In some embodiments, the upper leg mechanism 1 and the lower leg mechanism 5 may be operably coupled at the lower knee joint B2.

In various embodiments, as the follower joint C1 travels around the follower pathway 2, the upper follower connector 3 and the lower follower connector 4 move and in accordance with these movements, the upper leg mechanism 1 and the lower leg mechanism 5 also move between varying degrees of bent and straightened positions about the lower knee joint B2.

Referring now to FIG. 1A, the leg actuator mechanism is in a first position, such that the follower joint C1 is positioned at the bottom of the follower pathway 2. In such an embodiment, in an instance the follower joint C1 is positioned at the bottom of the follower pathway, the angle defined between the upper leg mechanism and the lower leg mechanism may be greater than 90 degrees. In some embodiments, the angle defined between the upper leg mechanism and the lower leg mechanism may be greater than 120. In some embodiments, the angle defined between the upper leg mechanism and the lower leg mechanism may be greater than 150. In some embodiments, the angle defined between the upper leg mechanism and the lower leg mechanism may be slightly less than 180 degrees (e.g., between 150 degrees and 180 degrees).

In some embodiments, the angle defined between the angel defined between the upper leg mechanism 1 and the lower mechanism 5 may be approximately the same as the angle defined between the upper leg mechanism 1 and the upper follower connector 3 (e.g., the angle defined between Joint A, Joint B1, and Joint C1). Additionally, in some embodiments, the angle defined between the upper leg mechanism 1 and the upper follower connector 3 (e.g., the angle defined between Joint A, Joint B1, and Joint C1) may be approximately the same as the angle defined between the lower follower connector 4 and the lower leg mechanism (e.g., the angle defined between Joint C1, Joint C2, and Joint D).

Referring now to FIG. 1B, the leg actuator mechanism moves into a second position as the follower joint C1 travels clockwise along the follower pathway 2. As the leg actuator mechanism moves from the first position to the second position, the angle defined between the upper leg mechanism and the lower leg mechanism may reduce only slightly (e.g., less than 30 degrees). In some embodiments, the combination of the upper leg mechanism 1 and the lower leg mechanism 5 may be rotated about hip joint A (e.g., hip joint A may be stationary).

Referring now to FIG. 1C, the leg actuator mechanism moves into a third position as the follower joint C1 continues to move along the follower pathway 2 (e.g., in the third position, the follower joint C1 may be positioned directly above the follower joint position when in the first position, shown in FIG. 1A). As the follower joint C1 moves from the second position (FIG. 1B) to the third position (FIG. 1C), the lower follower connector 4 moves the lower leg mechanism 5 such that the angle defined between the upper leg mechanism 1 and the lower leg mechanism 5 may be reduced from the angle defined in the first position and/or the second position. For example, the angle defined between the upper leg mechanism and the lower leg mechanism may less than 120 degrees. In some embodiments, the angle defined between the upper leg mechanism and the lower leg mechanism may be less than 90 degrees. In some embodiments, the angle defined between the upper leg mechanism and the lower leg mechanism may be less than 60 degrees.

Referring now to FIG. 1D, the leg actuator mechanism moves into a fourth position as the follower joint C1 continues to move along the follower pathway 2. In various embodiments, as the follower joint C1 travels along the follower pathway 2, the angle defined between the upper leg mechanism and the lower leg mechanism may increase from the third position. In some embodiments, the angle defined between the upper leg mechanism and the lower leg mechanism at the fourth position and the second position may be the same (e.g., with the heel joint D rotating around hip joint A). In various embodiments, as the follower joint C1 is driven around the follower pathway 2 (e.g., such as discussed below), the leg actuator mechanism may rotate through each position shown in FIGS. 1A-1D.

In various embodiments, the follower pathway may define an elliptical pathway. In some embodiments, the placement of the heel joint D may be based on the position of the follower joint C1 along a first direction (e.g., along a horizontal direction along the x-axis shown in FIG. 1A) in the follower pathway 2. In various embodiments, the angle defined between the upper leg mechanism 1 and the lower leg mechanism 5 may be based on the position of the follower joint C1 along a second direction (e.g., along a vertical direction along the y-axis shown in FIG. 1A) within the follower pathway 2. In various embodiments, the first direction and the second direction may be approximately 90 degrees apart from another (e.g., the first direction and the second direction may form approximately a right angle). While the first direction and second direction discussed in reference to FIG. 1A are approximately horizontal and vertical respectively, the axes may be rotated, such that the first direction is not along the horizontal axis and/or the second direction is not along the vertical axis. In various embodiments, the first direction and the second direction may be defined based on the position of A relative to the follower pathway. For example, Joint A may be in the first direction relative to the follower pathway (e.g., Joint A may be a fixed pivot point for the leg actuator mechanism).

Referring now to FIG. 2A-2B, the components shown in the leg actuator mechanism are approximated to the human body in accordance with an example embodiment of the present disclosure. As shown, the hip joint A corresponds to the pelvis and/or hip region of a human body. In various embodiments, the hip joint A may be fixed during movement. In some embodiments, the upper leg mechanism 1 may approximate the femur bone of a leg. Additionally, the lower knee joint B2 may approximate the knee of a leg. In some embodiments, the lower leg mechanism 5 may be approximated as a shin bone and the heel or ankle of a human may approximated as the heel joint D. In various embodiments, the angle defined between the upper leg mechanism 1 and the lower leg mechanism 5 may be the same as the angle defined between the femur and the shin.

Referring now to FIGS. 3A-3B, a portion of a leg actuator mechanism is provided in accordance with an example embodiment of the present disclosure. In some embodiments, a leg actuator mechanism may include a mounting disc assembly 6 configured as a part of the leg actuator mechanism. In various embodiments, the femur mounting connector 6 connects the femur 7a (shown in FIGS. 4A-8) to the mounting disk 6b. In some embodiments, the mounting disc 6b may define the follower pathway 2 configured to receive the follower joint C1 (as shown in FIG. 3B, the bolt 6e). In various embodiments, the angle defined between the femur 7a and the shin 7c (shown in FIGS. 4A-8) may be based on the position of the follower joint C1 along the second direction within the follower pathway and the position of the foot of the leg actuator mechanism may be based on the position of the follower joint C1 along the first direction within the follower pathway. In some embodiments, the upper follower connector 3 shown in FIGS. 1A-1D may correspond to link 6d. In various embodiments, the driving disc 6c may be configured to drive the follower joint C1 (as shown in FIG. 3B, the bolt 6e) about the follower pathway. In various embodiments, the driving disc 6c may be activated by a driving mechanism (e.g., as discussed below in reference to FIGS. 9-10).

Referring now to FIGS. 4A-4D, four different leg positions are shown in accordance with an example embodiment of the present disclosure. In various embodiments, the four positions of the leg actuator mechanism shown in FIGS. 4A-4D correspond to the four positions discussed in reference to FIGS. 1A-1D. As shown in FIGS. 4A-4D, the positions of the leg actuator mechanism simulate the movement of a leg during movement (e.g., walking or running).

As shown, the movement between the first position through the fourth position simulates the movement of a leg. Referring now to FIG. 5, a cut-away view of the leg actuator mechanism is shown in accordance with the first position shown in FIG. 4A. In various embodiments, the femur 7a may correspond to the upper leg mechanism 1 shown in FIGS. 1A-1D. In some embodiments, the internal femur link 7b may correspond to the lower follower connector 4 shown in FIGS. 1A-1D. In some embodiments, the shin 7c may correspond to the lower leg mechanism 5 shown in FIGS. 1A-1D. In various embodiments, the angle defined between the femur 7a and the shin 7c may be slightly less than 180 degrees.

Figures 4A, 4B, 4C, 4D:
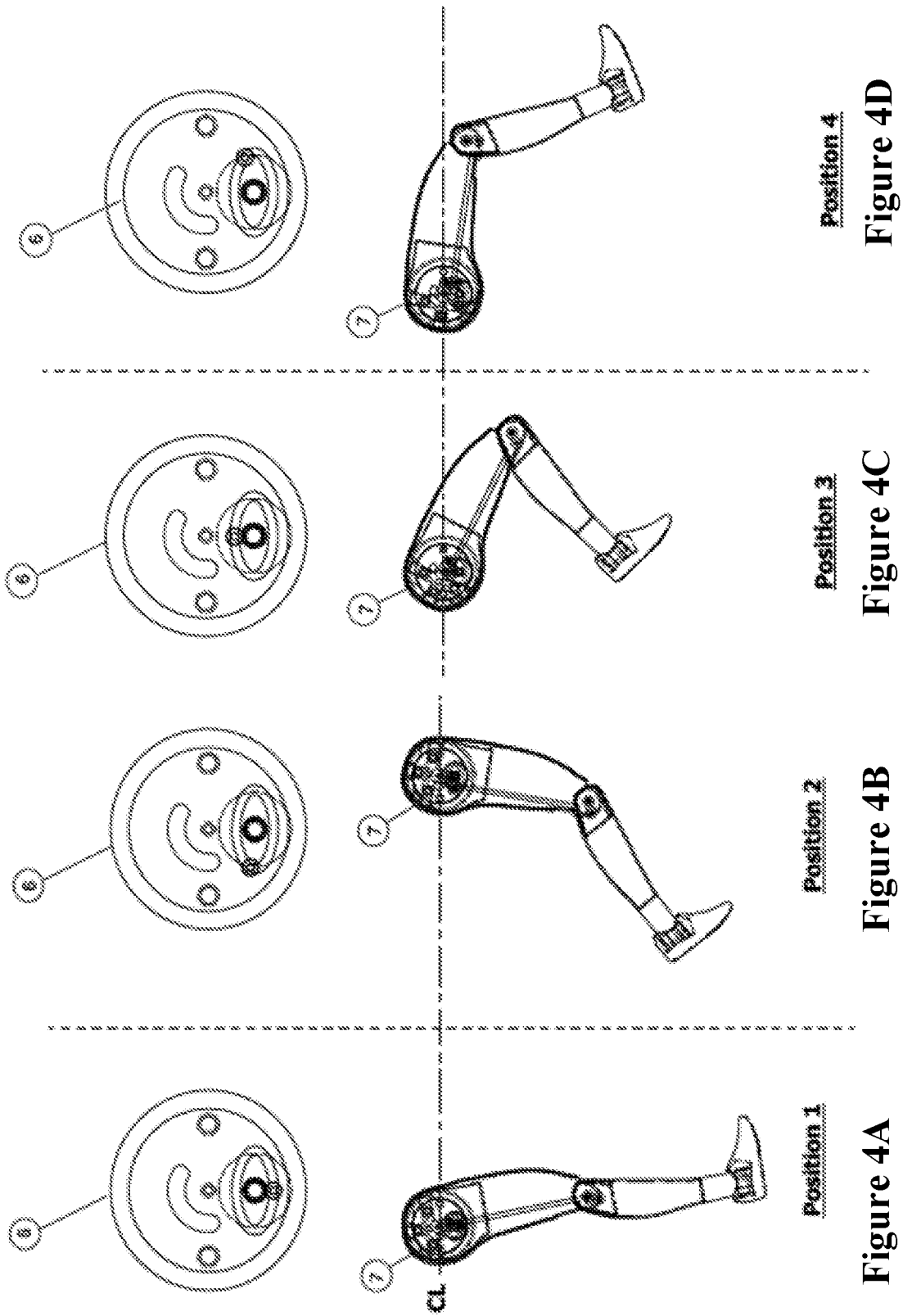

Referring now to FIG. 6, a cut-away view of the leg actuator mechanism is shown in accordance with the second position shown in FIG. 4B. As discussed in reference to FIG. 1B above, as the follower joint C1 travels along the follower pathway, the upper leg mechanism (e.g., the femur 7a) and the lower leg mechanism (e.g., the shin 7c) rotate about the hip joint A (shown in FIG. 3). Additionally, as the leg moves from the first position to the second position, the angle defined between the femur 7a and the shin 7c may begin to decrease. In various embodiments, the angle between the femur 7a and the shin 7c may have a predetermined range of motion. For example, in some embodiments, the range of motion may be from approximately 45 degrees to 180 degrees. In various embodiments, the range of motion may be based on the use case (e.g., the range of motion of the angle defined between the femur 7a and the shin 7c may be similar to the range of motion of a human femur and shin). In some embodiments, the angle between the femur 7a and the shin 7c may exceed 180 degrees (e.g., to simulate a wider range of motion). In such an embodiment, the Joint A may remain stationary, while other components may operate in a mirrored position.

Referring now to FIG. 7, a cut-away view of the leg actuator mechanism is shown in accordance with the third position shown in FIG. 4C. As discussed in reference to FIG. 1C above, as the follower joint C1 travels along the follower pathway from the second position to the third position, the angle defined between the upper leg mechanism (e.g., femur 7a) and the lower leg mechanism (e.g., shin 7c) may continue to decrease. Additionally, the shin 7c (and subsequently the foot of the leg) may begin to move forward based on the movement along the follower joint C1.

Referring now to FIG. 8, a cut-away view of the leg actuator mechanism is shown in accordance with the fourth position shown in FIG. 4D. As discussed in reference to FIG. 1D above, as the follower joint C1 continues to travel along the follower pathway from the third position to the fourth, the angle defined between the upper leg mechanism (e.g., femur 7a) and the lower leg mechanism (e.g., shin 7c) begins to increase. In various embodiments, the angle defined between the upper leg mechanism (e.g., femur 7a) and the lower leg mechanism (e.g., shin 7c) may be the same as the angle in the second position. In various embodiments, in an instance the follower joint C1 continues to travel along the follower pathway in the clock-wise direction, the leg actuator mechanism would move from the fourth position back to the first position. In an instance the follower joint C1 moves clock-wise around the follower pathway, then the leg actuator may simulate forward motion (e.g., forward walking or running). In an instance the follower joint C1 moves counter-clockwise around the follower pathway, then the leg actuator may simulate backward motion (e.g., backward walking or running).

Referring now to FIGS. 9A-10B, a doll is provided in accordance with an example embodiment of the present embodiment. As shown, the doll includes a driving mechanism 12 configured to activate the movement of the driving disc 6c shown in FIG. 3B. In various embodiments, the driving mechanism 12 may be partially or completely internal and/or external.

In an example embodiment, shown in FIG. 9B, the driving mechanism 12 may have a mounting bracket 12a. In some embodiments, the mounting bracket 12a may be part of the internal and/or external structure of a doll. In some embodiments, the driving mechanism 12 may have one or more driving inserts (e.g., internal driving insert 12a and/or external driving insert 12d) configured to receive a driver insert (discussed in reference to FIG. 11 below). In various embodiments, as shown in FIG. 9B, the driving inserts may be configured to rotate such that the rotational motion from the driver insert may be transferred to the driving mechanism 12 and subsequently to the driving disc 6c. In various embodiments, the driving mechanism 12 may include one or more links configured to translate the rotational motion between different items (e.g., 12j).

By way of example, a driver insert (not shown) may be attached to the driving insert 12d and transfer rotational motion into the driving mechanism 12. In such an example, the rotational motion may be translated between the driving insert 12d and the disc 12c (e.g., via operably coupling). The disc 12c may then be coupled to the arm mechanism 12b (e.g., to move the arms during motion). Additionally, the rotational motion of the driving insert 12d may be transferred to disc 12f. In such a case, the disc 12f may be coupled to the link 12h such that the rotational motion is translated to the disc 12i, which is operably coupled with the driving disc 6c (shown in FIG. 3). Various embodiments would be evident to one of ordinary skill in the art based on the disclosure provided herein. FIGS. 10A and 10B also show additional angles of the driving mechanism 12 interaction with the mounting assembly 6 discussed herein.

In various embodiments, as shown in FIGS. 9A-10B, the doll 8 may be configured with a plurality of leg actuator mechanisms (e.g., one for each leg). In some embodiments, the driving mechanism 12 may be configured to activate a plurality of leg actuator mechanisms simultaneously (e.g., two legs may be offset to allow for accurate running simulation for two legs). Additionally, the driving mechanism 12 may be used to rotate one or more arm mechanisms as discussed herein. In some embodiments, the rotational movement of a driving insert (e.g., 12e and/or 12d may result in a plurality of leg actuator mechanisms and arm mechanisms to be moved. For example, the one driving insert may provide rotational movement for two legs and two arms (e.g. for a humanoid doll). Various other animals (e.g., legged animals) may also be simulated using various embodiments discussed herein. In some embodiments, different character (e.g., humanoid doll or animal) may have a follower pathway defined specifically based on that character. For example, the length of the follower pathway may be longer to simulate a larger leg motion. In some embodiments, multiple follower pathways and/or follower mechanisms may be used to simulate more complex motions (e.g., to simulate animals with multi-jointed legs).

Referring now to FIGS. 11A-11B, multiple views of a carrier mechanism 10 are provided in accordance with an example embodiment of the present disclosure. In various embodiments, the carrier mechanism 10 may include a driving control means (e.g., a steering wheel and/or handle bars 10a). In some embodiments, the carrier mechanism 10 may optionally have an impact barrier 10b to protect the doll during operation. In some embodiments, the existence of the impact barrier 10b may be based on the material of the doll (e.g., a doll made out of a cushioning material, such as polyurethane foam, may not need to be as protected). In various embodiments, the carrier mechanism 10 may include a doll latch 10c configured to removably attach the doll to the carrier mechanism. Additionally, as discussed in reference to FIGS. 12-13, the carrier mechanism may include a vehicle latch 10d configured to removably attach the doll to the carrier mechanism 10. In some embodiments, the carrier mechanism may be unitary with the vehicle. Various carrier mechanisms 10 may be used in order to transfer rotational motion to the driving mechanism 12 discussed above and FIGS. 11A-13 are merely illustrative of an example embodiment.

As show in FIG. 11C, the driver insert 10e may be configured to mate with a driving insert (e.g., driving insert 12e) such that the rotation of the driver insert 10e may be transferred to the driving mechanism 12. In various embodiments, the driver insert 10e may be in communication with one or more wheels of the carrier mechanism 10 (e.g., the rotational movement of the wheels may be transferred to the driver insert 10e via a pulley or link).

Referring now to FIGS. 12 and 13, a movement doll system is provided in accordance with an example embodiment. Referring now to FIG. 12, the doll 8, the carrier mechanism 10, and the vehicle 11 are provided detached from one another. Referring now to FIG. 13, the doll 8 may be attached to the carrier mechanism 10 as discussed above (e.g., operably coupling of the driving insert and the driver insert). Additionally, the vehicle 11 may be attached to carrier mechanism 10 via the vehicle latch 10d discussed above. In some embodiments, the vehicle 11 and the carrier mechanism 10 may be unitary (e.g., a specially designed vehicle with the carrier mechanism included). In various embodiments, other types of vehicles 11 may be used. For example, the vehicle may be a recreational vehicle, such as a bicycles, scooters, miniature cars, radio-controlled cars, and skateboards, or the like. In various embodiments, the vehicle may be specially designed for a given doll (e.g., to be used as a set). Alternatively, the carrier mechanism 10 may be an attachment to an existing vehicle (e.g., a carrier mechanism may be attached to a bicycle).

Various embodiments discussed herein allow for dolls to simulate motion (e.g., running and/or walking) in a more realistic fashion that allows for a more immersive user experience. For example, embodiments discussed herein allow for a doll to "run" along with a child when riding a vehicle, such as a bicycle or scooter or the like.

Although the present invention has been illustrated and described herein with reference to preferred embodiments and specific examples thereof, it will be clear to those of ordinary skill in the art that other embodiments and examples may perform similar functions and/or achieve like results. All such equivalent embodiments and examples are within the spirit and scope of the present invention, are contemplated thereby, and are intended to be covered by the following claims.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A leg actuator mechanism comprising:
   an upper leg mechanism comprising a hip end and an opposing knee end;
   a lower leg mechanism comprising a first end and an opposing second end, wherein the first end of the lower leg portion is operably coupled to the knee end of the upper leg portion; and
   a follower mechanism comprising:
      a mounting defining a follower pathway configured to receive a follower joint;
      an upper follower connector, wherein the upper follower connector is attached at a first upper follower end to the follower joint and to the upper leg portion at a second upper follower end, wherein the upper follower connector is attached to the upper leg portion between the hip end and the knee end; and
      a lower follower connector, wherein the lower follower connector is attached at a first lower follower end to the follower joint and to the lower leg portion at a second lower follower end, wherein the lower follower connector is attached to the lower leg portion between the first end of the lower leg portion and the second end of the lower leg portion,
   wherein the follower mechanism is configured to move at least one of the upper leg mechanism or the lower leg mechanism when activated.

2. The leg actuator mechanism of claim 1, wherein the follower mechanism is configured to move the upper leg mechanism and the lower leg mechanism between a bent position and a straight position, wherein an angle defined between the upper leg mechanism and the lower leg mechanism in the straight position is greater than the bent position.

3. The leg actuator mechanism of claim 1, wherein a location of the second end of the lower leg mechanism is based on a location of the follower joint along a first direction within the follower pathway.

4. The leg actuator mechanism of claim 1, wherein an angle defined between the upper leg mechanism and the lower leg mechanism is based on a location of the follower joint along a second direction within the follower pathway.

5. The leg actuator mechanism of claim 1, wherein the hip end of the upper leg mechanism is fixed relative to the leg actuator mechanism.

6. The leg actuator mechanism of claim 1, wherein the follower pathway is an elliptical pathway.

7. The leg actuator mechanism of claim 1, further comprising a driving mechanism configured to move the follower joint along the follower pathway.

8. A doll for dynamic movement, the doll comprising:
   a doll body configured with at least one moveable leg;
   the leg actuator mechanism of claim 1 configured to move the at least one moveable leg; and
   a drive mechanism comprising a driving insert, wherein the rotational movement of the driving insert is transferred to the at least one leg actuator mechanism via one or more links.

9. The doll of claim 8, wherein the driving insert is configured to receive a driver insert, wherein the driver insert is configured to activate the drive mechanism.

10. The doll of claim 9, further comprising a carrier mechanism removably attached to the drive mechanism, where the carrier mechanism is configured with the driver insert to activate the drive mechanism via rotational movement.

11. The doll of claim 10, wherein the carrier mechanism is attached to a vehicle, wherein the activation of the driver insert is based on movement of the vehicle.

12. The doll of claim 8, further comprising one or more arm mechanisms operably coupled with the drive mechanism configured to move based on the rotational movement of the driving insert.

13. The doll of claim 8, wherein the driving insert is internal of the doll body.

14. A method of manufacturing a leg actuator mechanism, the method comprising:
   providing an upper leg mechanism comprising a hip end and a knee end;
   providing a lower leg mechanism comprising a first end and a second end, wherein the first end of the lower leg portion is operably coupled to the knee end of the upper leg portion; and
   defining a follower pathway within a mounting configured to receive a follower joint;
   attaching an upper follower connector at a first upper follower end to the follower joint and to the upper leg portion at a second upper follower end, wherein the upper follower connector is attached to the upper leg portion between the hip end and the knee end; and
   attaching a lower follower connector at a first lower follower end to the follower joint and to the lower leg portion at a second lower follower end, wherein the lower follower connector is attached to the lower leg portion between the first end of the lower leg portion and the second end of the lower leg portion,
   wherein the mounting, the upper follower connector, and the lower follower connector define a follower mechanism and the follower mechanism is configured to move at least one of the upper leg mechanism or the lower leg mechanism when activated.

15. The method of claim 14, wherein the follower mechanism is configured to move the upper leg mechanism and the lower leg mechanism between a bent position and a straight position, wherein an angle defined between the upper leg mechanism and the lower leg mechanism in the straight position is greater than the bent position.

16. The method of claim 14, wherein a location of the second end of the lower leg mechanism is based on a location of the follower joint along a first direction within the follower pathway.

17. The method of claim 14, wherein an angle defined between the upper leg mechanism and the lower leg mechanism is based on a location of the follower joint along a second direction within the follower pathway.

18. The method of claim 14, further comprising affixing the hip end of the upper leg mechanism relative to the leg actuator mechanism.

19. The method of claim 14, wherein the follower pathway comprises an elliptical pathway.

20. The method of claim 14, further comprising providing a driving mechanism configured to move the follower joint along the follower pathway.

* * * * *